United States Patent [19]

Francis et al.

[11] Patent Number: 5,287,623
[45] Date of Patent: Feb. 22, 1994

[54] BEARING SPLIT OUTER RING AND METHOD OF ASSEMBLY

[75] Inventors: Thomas M. Francis, Litchfield; Gary T. Schick, Goshen, both of Conn.

[73] Assignee: The Torrington Company, Torrington, Conn.

[21] Appl. No.: 74,503

[22] Filed: Jun. 11, 1993

Related U.S. Application Data

[60] Continuation of Ser. No. 2,569, Jan. 11, 1993, abandoned, which is a division of Ser. No. 825,233, Jan. 24, 1992, abandoned.

[51] Int. Cl.5 .............................................. B23P 15/00
[52] U.S. Cl. ..................... 29/898.062; 29/898.064; 29/898.065; 384/570
[58] Field of Search .................. 29/890.062, 898.063, 29/898.065, 898.067, 898.064, 898.06, 428; 384/273, 570

[56] References Cited

U.S. PATENT DOCUMENTS

| | | | |
|---|---|---|---|
| 1,395,385 | 11/1921 | Buckwalter | 29/898.067 |
| 1,481,705 | 1/1924 | Gimeno . | |
| 1,863,809 | 6/1932 | Hopkins et al. . | |
| 2,371,400 | 3/1945 | Mantle . | |
| 3,007,754 | 11/1961 | Cross . | |
| 3,140,130 | 7/1964 | Barr . | |
| 4,643,595 | 2/1987 | Weabiss | 29/898.063 |

FOREIGN PATENT DOCUMENTS

| | | |
|---|---|---|
| 156243 | 9/1903 | Fed. Rep. of Germany . |
| 698002 | 10/1940 | Fed. Rep. of Germany . |
| 960514 | 3/1957 | Fed. Rep. of Germany . |
| 0044169 | 3/1980 | Japan .................. 29/898.063 |

Primary Examiner—Irene Cuda
Attorney, Agent, or Firm—John C. Bigler

[57] ABSTRACT

A bearing split outer ring for mounting in a bearing housing, the split outer ring having a first portion subtending somewhat more than 185 degrees of arc and a second portion subtending somewhat less than 185 degrees of arc. The first and second portions of the split outer ring being sized with respect the bearing housing to provide an interference fit therein. In another aspect of the present invention, this is accomplished by providing a method of assembly of a housed bearing. The assembly steps comprise providing a split outer ring with two unequal portions, retaining the split outer ring over an inner raceway with rolling elements therebetween to form a subassembly, positioning the subassembly in a housing base such that the ends of the outer ring are all contained within the housing base, and thereafter, mounting a housing cover over the subassembly.

8 Claims, 3 Drawing Sheets

BEARING SPLIT OUTER RING AND METHOD OF ASSEMBLY

This is a continuation of application Ser. No. 08/002,569 filed Jan. 11, 1993, which is a divisional of prior application Ser. No. 07/825,233 filed on Jan. 24, 1992.

BACKGROUND OF THE INVENTION

This invention relates generally to rotary bearings with split rings and, more particularly, to a split outer ring for a housed antifriction bearing.

Many applications, such as line shafting, for example, require bearings that are installed radially rather than axially, over the end of a shaft. Such bearings used in the main bearing positions of two-cycle and four-cycle engines typically use split (or fractured) outer rings. To avoid fretting of the outer rings and to reduce wear of the bearing seats, the outer rings are made oversize to engage the bearing seats with a moderate interference fit.

The normal assembly procedure is to place a split cage and roller assembly, or other complement of rolling elements, on the crankshaft journal and then install the split outer ring over them. A snap ring or wire ring may be placed around the outer ring to hold the halves together. The crankshaft with the split outer ring and rolling elements is then fitted into bearing seats in the engine block. A cover providing the other half of the bearing seat is then installed over the split outer ring, and the assembly is bolted together.

Traditionally, the outer ring is split in two places 180 degrees apart. A dowel pin in the engine block engages the split outer ring to locate the race axially and to orient the split. Typically the ring splits are oriented so they are located 10 to 30 degrees from the parting line between the engine block and the cover.

Fitting the split outer ring in the engine block causes the halves of the outer ring to shift out of alignment as one half is compressed radially inward by the interference fit while the other half is free and not compressed. When the cover is installed and bolted to the engine block, the split surfaces of the outer ring bind together. This can result in mismatch of the outer ring at the split locations, causing undesirable noise or premature fatigue failure of the outer ring or rolling elements.

Some manufacturers have tried to overcome this problem by installing the outer rings with the ring split plane 90 degrees to the split line between the engine block and cover. Such a configuration is unsatisfactory because the split portion of the outer ring is then located in the most heavily loaded part of the load zone.

The foregoing illustrates limitations known to exist in present split bearing rings. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a bearing split outer ring for mounting in a bearing housing, the split outer ring having a first portion subtending somewhat more than 180 degrees of arc and a second portion subtending somewhat less than 180 degrees of arc. The first and second portions of the split outer ring being sized with respect the bearing housing to provide an interference fit therein.

In another aspect of the present invention, this is accomplished by providing a method of assembly of a housed bearing. The assembly steps comprise providing a split outer ring with two unequal portions, retaining the split outer ring over an inner raceway with rolling elements therebetween to form a subassembly, positioning the subassembly in a housing base such that the ends of the outer ring are all contained within the housing base, and thereafter, mounting a housing cover over the subassembly.

The foregoing and other aspects will become apparent from the following detailed description of the invention when considered in conjunction with the accompanying drawing figures.

BRIEF OF THE DRAWING FIGURES

In this specification, identical elements in different figures are given identical reference characters.

DETAILED DESCRIPTION

Figure 1:
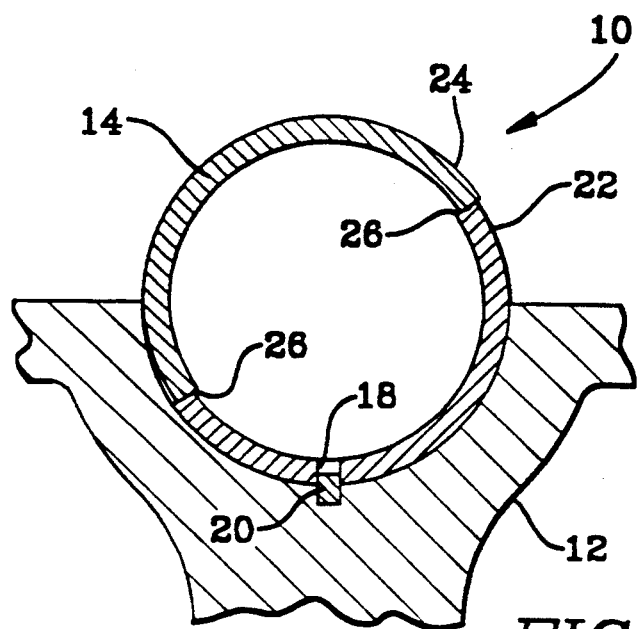
FIG. 1 is a cross-sectional view of a prior art bearing split outer ring, positioned in a corresponding housing base.

Referring to FIG. 1, a bearing split outer ring 10, typical of the prior art, is shown positioned in a housing base 12 that provides a bearing seat for half of the split outer ring 10. The split outer ring 10 is divided substantially in half to form two portions 14 and 16. An aperture 18 is provided in the lower portion 16 for engagement with a dowel pin 20 to locate the split outer ring 10 axially and to orient the split.

The housing base 12 provides an interference fit with the perimeter of portion 16 of the split outer ring 10, compressing free end 22 thereof radially inward. Because the split is generally oriented at 10 to 30 degrees from the parting line of the housing base, free end 24 of the upper portion 14 of split outer ring 10 is not compressed radially inward. As a result, steps 26 can occur in the split outer ring 10 due to mismatch of the upper and lower portions 14 and 16.

Figure 2:
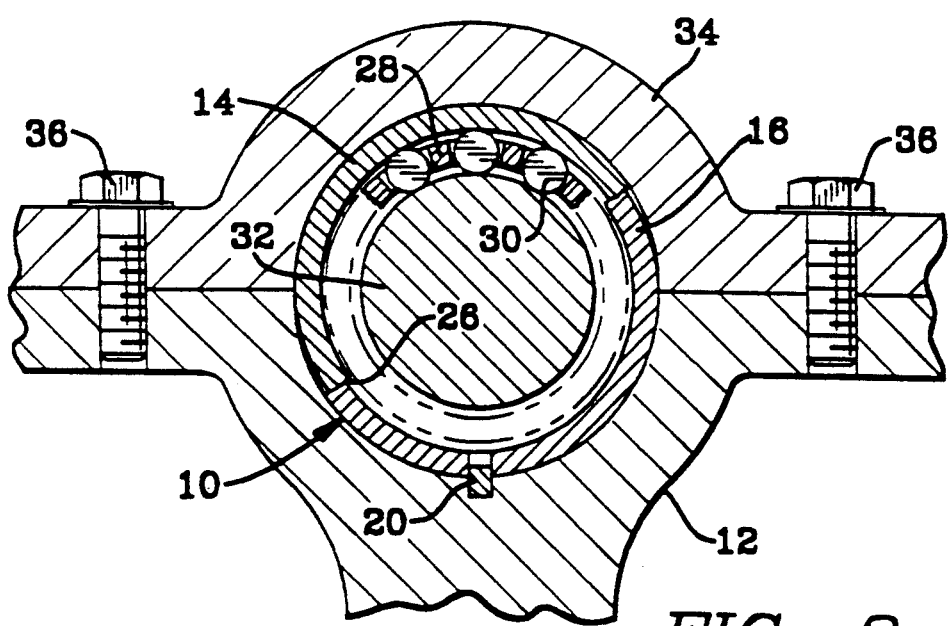
FIG. 2 is a cross-sectional view of a prior art bearing and housing assembly including the bearing split outer ring and housing base of FIG. 1.

FIG. 2 shows the same split outer ring 10 assembled in a main bearing location of a two-cycle or four-cycle engine. Split cage 28, rolling elements 30, and crankshaft journal 32 are positioned within the split outer ring 10 and cover 34 is added. The cover 34 is mounted on the housing base 12 by cap screws 36 to provide an upper bearing seat and complete the housing for the split outer ring 10.

As illustrated, the steps 26 caused by the mismatch of the upper and lower portions 14 and 16 of the split outer ring 10 can remain after the cover 34 is installed. The interference fit of the housing base 12 and the cover 34 can cause the ends 22 and 24 to bind together, particularly if the split in the outer ring is formed by fracturing or is otherwise irregular.

Figure 3:
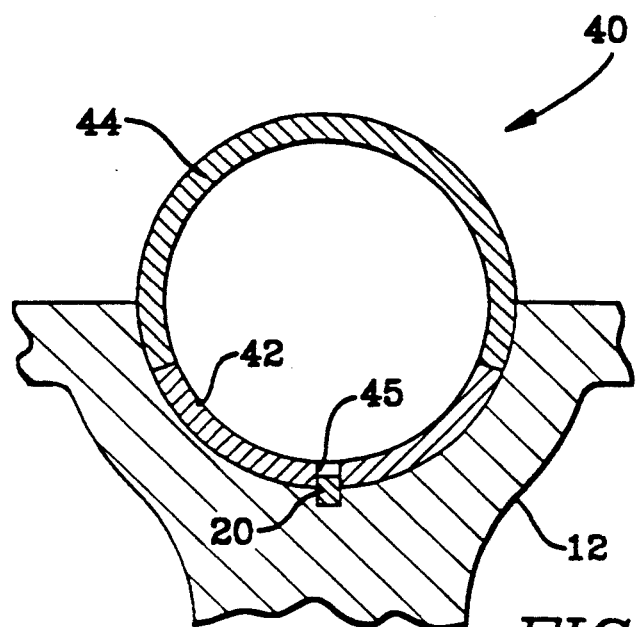
FIG. 3 is a pictorial view of a preferred embodiment of the bearing split outer, ring of the present invention together with a retaining ring.
Figure 4:
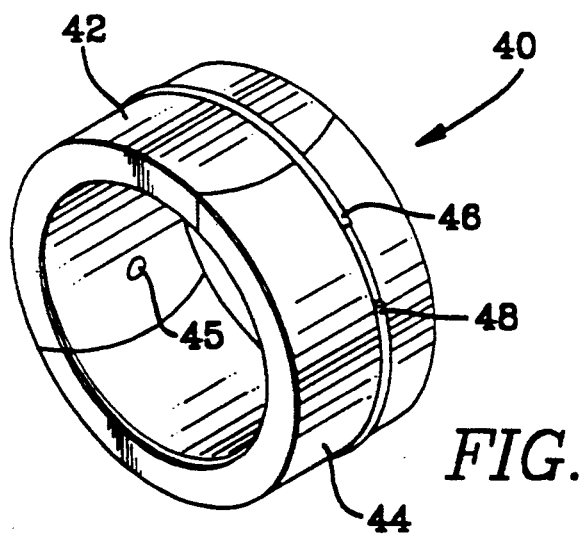
FIG. 4 is a cross-sectional view of the preferred embodiment of the bearing split outer ring of FIG. 3, positioned in a corresponding housing base.
Figure 5:
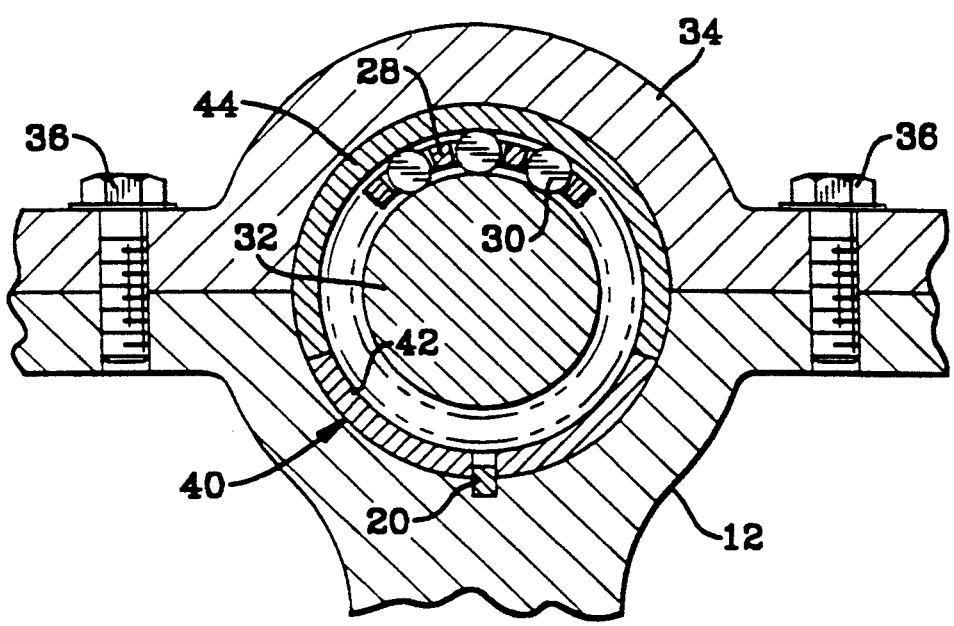
FIG. 5 is a cross-sectional view of a bearing and housing assembly including the preferred embodiment of the bearing split outer ring of FIGS. 3 and 4.

In contrast to the prior art, split outer ring 40 of the present invention is split into two unequal portions, as illustrated in FIGS. 3, 4 and 5. In the preferred embodiment shown, lower portion 42 subtends approximately 165 degrees of arc and upper portion 44 subtends approximately 195 degrees of arc. It should be appreciated, however, that the invention anticipates a range of location of the splits where one portion is somewhat greater than 180 degrees in extent and the other is somewhat less than 180 degrees in extent.

The split outer ring 40 is placed in the housing base 12 such that the split lines are both within the housing base 12. As a result, the tendency of the ends of the upper and lower portions 42 and 44 to shift when the cover 34 is installed is substantially reduced. Preferably, the split lines are oriented by engagement at an aperture 45 with the dowel 20 or by other means to be equi-distant from the split line of the housing base 12 and cover 34, as shown.

Applicants prefer to form the split in the outer ring 40 by a fracturing technique similar to that described in U.S. Pat. Nos. 3,834,772 and 3,884,406. The minimum preferred interference fit is 0.0005 to 0.0010 inches to avoid fretting of the outer rings and to reduce wear on the bearing seats without resulting in mismatch of the upper and lower portions 42 and 44 of split outer ring 40. The preferred ranges of arc of the upper and lower portions 42 and 44 are 185 to 205 degrees and 175 to 155 degrees, respectively.

As shown in FIG. 4, upper and lower portions 42 and 44 are held in alignment by a retaining ring 46 prior to assembly in the housing base 34. The split outer ring 40 is formed with an annular V-shaped groove 48 for receiving the retaining ring 46. Such grooves and retaining rings are disclosed in U.S. Pat. Nos. 2,624,645 and 2,624,105 and are well known. The split outer ring 40 is positioned over the cage 28, rolling elements 30, and shaft journal 32, and is retained by the retaining ring 46, to form a subassembly.

The subassembly just described is then positioned in the housing base 12 and oriented by engagement with the dowel pin 20 before the cover 34 is added. Unlike the prior art split outer ring 10 of FIGS. 1 and 2, the cover 34 can be secured over split outer ring 40 of the present invention without compressing one free end thereof radially inward while forcing an adjacent free end radially outward, as shown in FIGS. 4 and 5.

A particular advantage of the present invention is enhanced operation and longevity due to the reduced chance of a step or mismatch in the raceway formed on the inside of the split outer ring. Applicants have found that the split outer ring described herein results in quieter operation of the housed bearing and in less likelihood of fatigue problems related to a step or mismatch of the raceway.

The preferred embodiment has been illustrated herein with respect to its application in the main bearing locations of two-cycle and four-cycle engines. However, it should be understood that the split outer ring and method of assembly of the present invention are also applicable to other uses of housed bearings with split rings.

Having described the invention, what is claimed is:

1. A method of assembly of a housed bearing, the method comprising the steps of:

providing a split outer ring, said outer ring being split into two unequal portions, the first of said portions subtending at least 185 degrees of arc and the second of said portions subtending no more than 175 degrees of arc;

retaining said split outer ring over an inner raceway with rolling elements therebetween to provide a subassembly, said portions of the outer ring having ends aligned relative to each other such that a uniform annular outer raceway is formed;

positioning said subassembly in a housing base such that the ends of the outer ring portions are all contained within the housing base, the housing base subtending approximately 180 degrees of arc; and thereafter, mounting a housing cover over said subassembly and against the housing base, the housing base and housing cover being dimensioned to provide an interference fit with said split outer ring.

2. The method of assembly according to claim 1, wherein the step of providing a split outer ring includes fracturing a one-piece outer ring into said two unequal portions.

3. The method of assembly according to claim 1, wherein the first of said unequal portions of the split outer ring subtends an arc of 185 to 205 degrees and the second of said unequal portions of the split outer ring subtends an arc of 155 to 175 degrees.

4. The method of assembly according to claim 1, wherein the step of retaining the split outer ring over an inner raceway includes positioning a retainer ring within an annular groove in a radially outward surface of the split outer ring.

5. The method of assembly according to claim 1, wherein the step of retaining the split outer ring over an inner raceway to provide a subassembly includes providing a split bearing cage holding said rolling elements, the split bearing cage being between the split outer ring and the inner raceway.

6. The method of assembly according to claim 1, further comprising providing an aperture within the second of said unequal portions of the split outer ring, the aperture receiving a projection means during the step of positioning the subassembly in the housing base to maintain orientation and location of the split outer ring.

7. The method of assembly according to claim 6, wherein said aperture and projection means are located such that ends of the first and second portions of the split outer ring are equi-distant from split lines between the housing base and housing cover.

8. The method of assembly according to claim 6, wherein said projection means is a dowel pin mounted in the housing base and extending outward therefrom.

* * * * *